(12) United States Patent
Kim et al.

(10) Patent No.: US 12,316,372 B2
(45) Date of Patent: May 27, 2025

(54) LOCALIZATION OF AN ANOMALY IN AN OPTICAL TRANSMISSION SYSTEM

(71) Applicant: Fujitsu Limited, Kawasaki (JP)

(72) Inventors: Inwoong Kim, Allen, TX (US); Olga I. Vassilieva, Plano, TX (US); Paparao Palacharla, Richardson, TX (US)

(73) Assignee: FUJITSU LIMITED, Kawasaki (JP)

( * ) Notice: Subject to any disclaimer, the term of this patent is extended or adjusted under 35 U.S.C. 154(b) by 283 days.

(21) Appl. No.: 17/986,815

(22) Filed: Nov. 14, 2022

(65) Prior Publication Data

US 2024/0162981 A1 May 16, 2024

(51) Int. Cl.
*H04B 10/07* (2013.01)
*H04B 10/079* (2013.01)

(52) U.S. Cl.
CPC .................. *H04B 10/0791* (2013.01)

(58) Field of Classification Search
CPC ............ H04B 10/07091; H04B 10/07955
See application file for complete search history.

(56) References Cited

U.S. PATENT DOCUMENTS

| | | | |
|---|---|---|---|
| 4,768,853 A * | 9/1988 | Bhagavatula | H04B 10/25133 385/124 |
| 5,189,483 A * | 2/1993 | Inagaki | G01M 11/335 356/73.1 |
| 5,201,830 A * | 4/1993 | Braswell | B64D 13/02 244/129.5 |
| 5,309,299 A * | 5/1994 | Crossland | G11B 21/10 |
| 6,534,997 B1 * | 3/2003 | Horishita | H04B 10/071 356/73.1 |
| 8,606,117 B1 * | 12/2013 | Turner | G01M 11/3118 298/20 R |
| 9,240,836 B1 * | 1/2016 | Chen | G01M 11/3136 |
| 11,397,207 B2 * | 7/2022 | Cabanillas | G01R 31/11 |
| 11,885,707 B2 * | 1/2024 | Cahill | G01M 11/3127 |
| 2002/0176070 A1 * | 11/2002 | Achtenhagen | G01M 11/338 356/73.1 |
| 2003/0151736 A1 * | 8/2003 | Achtenhagen | G01M 11/338 356/73.1 |

(Continued)

OTHER PUBLICATIONS

Luch et al. "Vibration Sensing for Deployed Metropolitan Fiber Infrastructure" Journal of Lightwave Technology (vol. 39, Issue: 4, Feb. 15, 2021).

(Continued)

*Primary Examiner* — Tanya T Motsinger
(74) *Attorney, Agent, or Firm* — Maschoff Brennan

(57) ABSTRACT

In an example, a method may include a first optical signal and a second optical signal being obtained by a receiving device. The first optical signal may include a first wavelength and the second optical signal may include a second wavelength. The method may also include obtaining a determination that a dynamic anomaly may be present in the transmission medium. In response to the determination that a dynamic anomaly is present in the transmission medium, a relationship between the first optical signal and the second optical signal may be determined to obtain a time delay. The method may include using the time delay, the first wavelength, and the second wavelength to determine an anomaly location in the transmission medium.

20 Claims, 5 Drawing Sheets

(56) References Cited

U.S. PATENT DOCUMENTS

| | | | | |
|---|---|---|---|---|
| 2003/0210725 | A1* | 11/2003 | Prassas | H01S 3/06716 |
| | | | | 372/50.1 |
| 2006/0093362 | A1* | 5/2006 | Welch | G02B 6/12019 |
| | | | | 398/87 |
| 2009/0003830 | A1* | 1/2009 | Fishman | H04J 14/0221 |
| | | | | 398/97 |
| 2009/0154938 | A1* | 6/2009 | Xia | H04B 10/0775 |
| | | | | 375/259 |
| 2010/0296819 | A1* | 11/2010 | Kahn | H04B 10/60 |
| | | | | 398/208 |
| 2011/0052195 | A1* | 3/2011 | Karstens | H04B 10/25891 |
| | | | | 398/79 |
| 2013/0070256 | A1* | 3/2013 | Tokimitsu | G01B 9/02007 |
| | | | | 356/498 |
| 2014/0133845 | A1* | 5/2014 | Dahlfort | H04L 41/0677 |
| | | | | 370/242 |
| 2014/0253915 | A1* | 9/2014 | Ataie | G01M 11/338 |
| | | | | 356/300 |
| 2014/0260638 | A1* | 9/2014 | Hood | G01N 29/14 |
| | | | | 73/647 |
| 2016/0011018 | A1* | 1/2016 | Holland | G01K 11/32 |
| | | | | 356/73.1 |
| 2018/0269964 | A1* | 9/2018 | Mertz | G02B 6/02061 |
| 2019/0103939 | A1* | 4/2019 | Al Sayeed | H04J 14/0287 |
| 2019/0229981 | A1* | 7/2019 | Chappell | G01R 31/08 |
| 2019/0317464 | A1* | 10/2019 | Frey | G06Q 10/06311 |
| 2020/0044734 | A1* | 2/2020 | Parkin | H04B 10/0791 |
| 2020/0182956 | A1* | 6/2020 | Whitehead | H02H 1/0007 |
| 2021/0248233 | A1* | 8/2021 | Manikantan Shila | |
| | | | | G01R 21/007 |
| 2022/0158731 | A1* | 5/2022 | Horikoshi | H04B 10/07951 |
| 2022/0350030 | A1* | 11/2022 | Shuman | G01S 19/48 |

OTHER PUBLICATIONS

Wellbrook et al. "First Field Trial of Sensing Vehicle Speed, Density, and Road Conditions by Using Fiber Carrying High Speed Data" 2019 Optical Fiber Communications Conference and Exhibition (OFC) (Mar. 2019).

* cited by examiner

LOCALIZATION OF AN ANOMALY IN AN OPTICAL TRANSMISSION SYSTEM

FIELD

The embodiments discussed in the present disclosure are related to localization of an anomaly in an optical transmission system.

BACKGROUND

Transmitting data between at least two remote points may be accomplished through various transmission mediums, which may include optical networks. In an optical network, data is conveyed in the form of optical signals through the transmission mediums, such as optical fibers and/or other optical media. In some circumstances, an optical signal may experience a degradation or other loss due to various external stimuli (e.g., a stimulus external to and/or not related to the optical network). Some external stimuli may be associated with an impairment to and/or defect in the transmission medium.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include a first optical signal and a second optical signal being obtained by a receiving device. The first optical signal may include a first wavelength and the second optical signal may include a second wavelength. The method may also include obtaining a determination that a dynamic anomaly may be present in the transmission medium. In response to the determination that a dynamic anomaly is present in the transmission medium, a relationship between the first optical signal and the second optical signal may be determined to obtain a time delay. The method may include using the time delay, the first wavelength, and the second wavelength to determine an anomaly location in the transmission medium.

The object and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
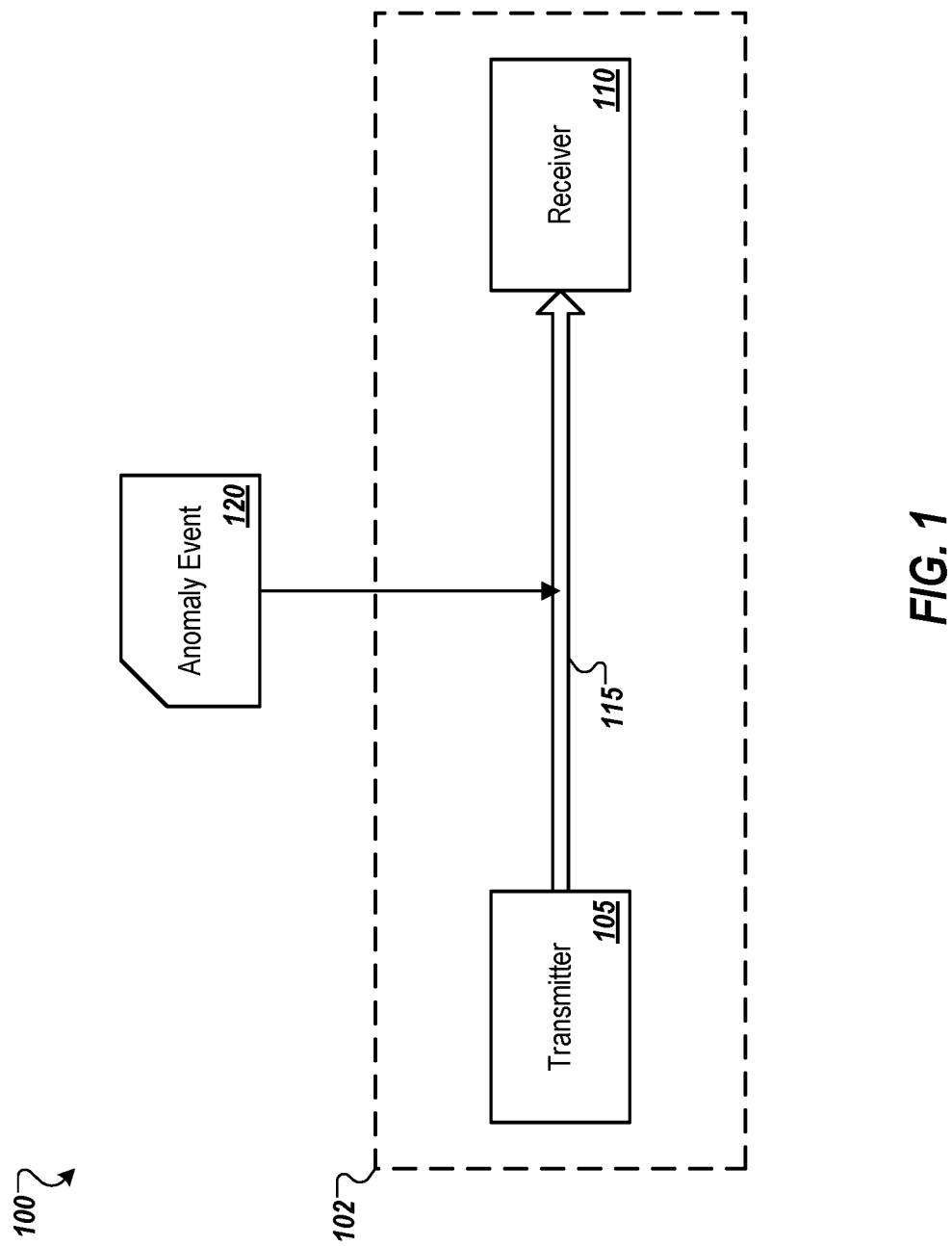
FIG. 1 is a block diagram of an example environment configured to localize a dynamic anomaly in an optical transmission system.

An optical network may be configured to transmit data via optical signals that may be carried by a transmission medium, such as optical fibers. In some circumstances, anomalies in the optical fibers may cause a degradation of the optical signals within the optical fibers, which may affect the transmitted data in the optical network. For example, a micro-bend in the optical fibers may cause a degradation of the optical signals which may cause portions of the transmitted data to not be received and/or to include errors in the received data. Increasingly significant anomalies may cause increasingly greater issues in an optical network up to and including failure of the optical network to transmit data. For example, a larger bend (e.g., compared to a micro-bend) and/or a break in the optical fibers may cause increasing degradations, errors, and/or a failure to transmit or receive data in the optical network.

In instances in which an anomaly (e.g., a dynamic anomaly) is detected within an optical fiber of an optical network, determining the location of the dynamic anomaly within the optical fiber may contribute to removing the dynamic anomaly from the optical network. For example, upon determining a location of the dynamic anomaly, arrangements may be made to correct the issue associated with the dynamic anomaly. For example, upon determining the location of a deformation, such as a micro-bend in an optical fiber, a technician may make repairs to the optical fiber (e.g., removing the bend, splicing new optical fiber in place of damaged optical fiber, removing the source of the cause of the dynamic anomaly, and the like) such that the dynamic anomaly may be removed from the optical network. Alternatively, or additionally, future damage to the optical fiber may be mitigated by providing a warning to other diggers about the location of the optical fiber. In the present disclosure, a dynamic anomaly may include an anomaly that may change with time. For example, digging activity around buried fiber cable may cause time-varying micro-bending (e.g., a dynamic anomaly). In contrast, a static anomaly may include an anomaly that may not change with time. For example, in instances in which one or more fiber cables are deployed and include an anomaly (e.g., a micro-bend in the fiber cables), the anomaly may remain in the fiber cables after deployment and may remain substantially unchanged therein.

According to one or more embodiments of the present disclosure, an optical network may be configured to determine a presence of a dynamic anomaly. The dynamic anomaly may be determined to be present in a transmission medium by observing variations in a received power of a first optical signal and a second optical signal in the optical network. In some circumstances, the first optical signal may be multiplexed with the second optical signal for transmission via the transmission medium of the optical network. The optical network may include one or more components that may determine an associated anomaly location within the transmission medium of the optical network. The anomaly location may be determined using characteristics of the transmission medium, a time delay between receiving a first optical signal and a second optical signal, and/or differences between a first optical signal wavelength and a second optical signal wavelength.

Embodiments of the present disclosure will be explained with reference to the accompanying drawings.

FIG. 1 is a block diagram of an environment 100 configured to localize a dynamic anomaly in an optical transmission system 102, in accordance with at least one embodiment of the present disclosure. The optical transmission system 102 may include a transmitter 105, a receiver 110, and a transmission medium 115.

In general, the optical transmission system 102 may be configured to transmit data from a first system or device at a first location to at least a second system or device at a second location via the transmission medium 115, as described herein. The optical transmission system 102 may be configured to detect anomalies in at least the transmission medium 115 which may affect a transmission traversing through the transmission medium 115. In some embodiments, the optical transmission system 102 may be configured to determine a location of the dynamic anomaly within the transmission medium 115, as described herein.

In the present disclosure, a dynamic anomaly may refer to dynamic physical deformities in the transmission medium 115 (e.g., a micro-bend of the optical fiber) and/or any other object or event that may affect performance of the optical transmission system 102 that is not part of regular characteristics of the optical transmission system 102. In some circumstances, the presence of a dynamic anomaly in the transmission medium 115 may cause a decrease and/or fluctuation in performance of the optical transmission system 102 and/or downtime (e.g., a loss of service). According to one or more aspects of the present disclosure, determining an anomaly location within a transmission medium, such as the transmission medium 115 may contribute to more quickly repairing, replacing the damaged transmission medium, or preventing possible failure within the transmission medium (e.g., by providing a warning to operators conducting operations that may damage the transmission medium, such as digging). For example, upon determining the anomaly location within a transmission medium, a technician may be deployed to the anomaly location to remove the dynamic anomaly, repair the transmission medium at the anomaly location, and/or remove the source of cause of the dynamic anomaly. In some circumstances, providing the anomaly location for maintenance and/or repair may reduce downtime in an optical transmission system and/or maintain performance of the transmission medium in the optical transmission system.

In some embodiments, the transmitter 105 may be configured to encode data into one or more optical signals. The optical signals may be transmitted by the transmitter 105 to the receiver 110 through the transmission medium 115. In some embodiments, multiple optical signals may be combined into a transmission through the transmission medium 115 between the transmitter 105 and the receiver 110. For example, multiple optical signals may be combined into the transmission medium 115 using wavelength division multiplexing (WDM), as described relative to FIG. 2.

In some embodiments, data may be encoded into the optical signals in multiple wavelengths, where a first optical signal encoded with first data may include a first wavelength, a second optical signal encoded with second data may include a second wavelength, and so forth. The one or more optical signals may be combined into a transmission and transmitted by the transmitter 105 and may include multiple wavelengths associated with the data. For example, a transmission may include a first optical signal including a first portion of data encoded having a first wavelength, a second optical signal including a second portion of the data encoded having a second wavelength, and so forth. Additional details associated with a transmission that may include multiple wavelengths is described herein relative to FIG. 2.

In some embodiments, a first wavelength associated with a first optical signal may differ from a second wavelength associated with a second optical signal. In some embodiments, the first wavelength and the second wavelength may be located in a similar range of the electromagnetic spectra (e.g., bands or ranges designated by the Institute of Electrical and Electronics Engineers (IEEE)). For example, the first wavelength may be approximately 1565 nm and the second wavelength may be approximately 1620 nm, where both the first wavelength and the second wavelength may be located in the L-band.

Alternatively, or additionally, the first wavelength and the second wavelength may be located in different bands from one another, where the first wavelength may be located in the L-band and the second wavelength may be located in the C-band. For example, the first wavelength may be approximately 1620 nm (e.g., the L-band) and the second wavelength may be approximately 1530 nm (e.g., the C-band). The aforementioned wavelengths are provided as examples only, as the wavelengths associated with one or more optical signals in the transmission may include any variation of wavelength for optical communications.

In some embodiments, the receiver 110 may be configured to receive and/or decode a transmission, including one or more optical signals, such that data included in the transmission and propagating in the transmission medium 115 may be received by the receiver 110. In instances in which multiple optical signals may be multiplexed together into the transmission, the receiver 110 may be configured to demultiplex the transmission, such that individual optical signals and/or data associated with the individual optical signals may be received by the receiver 110.

In some embodiments, the transmission medium 115 may be an optical fiber. The optical fiber may include any medium suitable for optical transmissions, such as glass, fluorozirconate glass, fluoroaluminate glass, crystalline materials, and/or any other suitable medium for optical transmissions. In some embodiments, the transmission medium 115 may include a single mode fiber (SMF) which may be configured to carry a single mode of light. Alternatively, or additionally, the transmission medium 115 may include a multi-mode fiber which may be configured to carry multiple modes of light.

In some embodiments, the transmission medium 115 may include a dispersion factor, which may be associated with the medium of the transmission medium 115. In some embodiments, the dispersion factor may cause variations in the propagation velocity of optical signals having different wavelengths. For example, the dispersion factor in the transmission medium 115 may cause a first optical signal having a first wavelength to propagate faster than a second optical signal having a second wavelength. In some embodiments, the dispersion factor associated with the transmission medium 115 may be used in determining an anomaly location, as described herein.

In some embodiments, a determination that a dynamic anomaly may be present in the transmission medium 115 may be obtained. In some embodiments, the receiver 110, associated receiver components, and/or monitoring components (not illustrated in FIG. 1; see the detectors 212 of FIG. 2 for an example optical signal monitor) may be configured to obtain the determination that a dynamic anomaly may be present in the transmission medium 115. Alternatively, or additionally, a computing system or device associated with the receiver 110 may be configured to obtain the determination that a dynamic anomaly may be present in the transmission medium 115.

In these or other embodiments, a dynamic anomaly may be determined to be present in the transmission medium 115 based, in part, on one or more received powers associated with the optical signals in the transmission. In some embodiments, an individual optical signal may include a received power that may be observed by the receiver 110 and/or may be measured by the receiver 110.

In some embodiments, the dynamic anomaly in the transmission medium 115 may be introduced by an anomaly event 120. In some embodiments, the anomaly event 120 may include a disturbance to the transmission medium 115 and/or a surrounding disturbance associated with the transmission medium 115 which surround disturbance may affect the transmission medium 115. For example, the anomaly event 120 may include digging adjacent to the transmission medium 115, which may cause an external force on the transmission medium 115 and may result in micro-bends and/or other anomalies in the transmission medium 115.

In some embodiments, the presence of a dynamic anomaly in the transmission medium 115 may be determined based on comparing a received power associated with an optical signal in a transmission with an expected power associated with the optical signal. For example, the receiver 110 may obtain a first received power associated with a first optical signal and a second received power associated with a second optical signal, and the receiver 110 may be configured to compare the first received power and the second received power with a first expected power (e.g., a first expected power associated with the first optical signal) and a second expected power (e.g., a second expected power associated with the second optical signal), respectively. Alternatively, or additionally, the receiver 110 may be communicatively coupled with a computing system or device and the computing system or device may be configured to determine the presence of a dynamic anomaly by comparing the received powers with the expected powers. In these or other embodiments, a dynamic anomaly may be determined to be present in the transmission medium 115 in instances in which the comparison of the received power associated with an optical signal with the expected power associated with the optical signal satisfies a power threshold.

For example, in instances in which the comparison between the received power and the expected power associated with an optical signal is equal to or greater than the power threshold, one or more additional computations may be performed by one or more components in the optical transmission system 102, as described herein, which may be associated with determining an anomaly location. In another example, in instances in which the comparison between the received power and the expected power associated with an optical signal is less than the power threshold, the receiver 110 and/or an associated computing device may determine that the transmitted optical signal may have experienced losses during the transmission thereof, and the receiver 110 and/or the associated computing device may not take additional actions. In these or other embodiments, the power threshold may be based on a type of the optical transmission system 102 (e.g., telecom, datacom, etc.), the wavelength of the optical signal, a receiver quality associated with the receiver 110 (e.g., how fine of differences may be detected), the medium of the transmission medium 115, and the like.

In some embodiments, the expected power associated with an optical signal may be determined based on one or more factors associated with the optical transmission system 102 and/or components included in the optical transmission system 102. For example, the expected power associated with an optical signal may be determined in view of the wavelength of the optical signal propagating in the transmission medium 115, the number of optical amplifiers included in the optical transmission system 102, the output power of the included optical amplifiers, the length of the transmission medium 115, an amount of loss associated with the material type of the transmission medium 115, and/or other factors associated with the optical transmission system 102.

In some embodiments, a time delay may be obtained between a first optical signal and a second optical signal of the transmission propagating in the transmission medium 115. In some embodiments, the time delay may be associated with a relationship between the first optical signal and the second optical signal. For example, in some embodiments, the time delay may be determined based on determining a cross-correlation between the first optical signal and the second optical signal, or in other words, determining a similarity of the first optical signal and the second optical signal as a function of the displacement of the first optical signal relative to the second optical signal. Additional discussion related to the relationship and the time delay between the first optical signal and the second optical signal is provided in this disclosure.

In some embodiments, the relationship between the first optical signal and the second optical signal may be obtained in response to the determination that a dynamic anomaly may be present in the transmission medium 115. For example, upon a system (e.g., the receiver 110 and/or a system, device, and/or component associated with the receiver 110) obtaining a determination that a dynamic anomaly may be present in the transmission medium, the system may perform a cross-correlation between the first optical signal and the second optical signal. In some embodiments, a dynamic anomaly may cause dynamic changes to a monitored power associated with an optical signal in the transmission medium 115. Therefore, in some embodiments, a cross-correlation between the first optical signal and the second optical signal may include a cross-correlation between a first monitored power of the first optical signal and a second monitored power of the second optical signal.

In some embodiments, the cross-correlation between the first optical signal and the second optical signal may include an integral of the first optical signal and/or a first monitored power associated with the first optical signal dotted with the second optical signal and/or a second monitored power associated with the second optical signal. The cross-correlation between the first signal and the second signal may be represented by the following equation:

$$\int_{-\infty}^{\infty} f(t)g(t+\tau)dt$$

where f(t) may be the first monitored power associated with the first optical signal and g(t) may be the second monitored power associated with the second optical signal. The result of the cross-correlation between the first optical signal and the second optical signal may yield a result as a function of $\tau$, which may include a delay between the first optical signal (e.g., f(t)) and the second optical signal (e.g., g(t)). In some embodiments, the time delay may be determined to be a maximum point of the resulting function of the cross-correlation between the first optical signal and the second optical signal. For example, the cross-correlation of the first optical signal and the second optical signal may yield a function in terms of $\tau$, and a maximum value of the function may be the obtained time delay.

In some embodiments, a location of the dynamic anomaly within the transmission medium 115 may be determined using the time delay, a first wavelength associated with the first optical signal, and a second wavelength associated with the second optical signal, as measured from the receiver end of the transmission medium 115 (e.g., adjacent to the receiver 110). For example, the location of the dynamic anomaly measured from the receiver end of the transmission medium 115 may be approximately equal to the time delay divided by a difference between the first wavelength and the second wavelength. The location of the dynamic anomaly in the transmission medium 115, as measured from the receiver end of the transmission medium 115, may be represented by the equation:

$$L \propto \tau_{max}/(\lambda_2 - \lambda_1)$$

where L is the length from the receiver end of the transmission medium 115 (e.g., adjacent to the receiver 110) to the dynamic anomaly, $\tau_{max}$ is the time delay that maximizes the cross-correlation between the first optical signal and the second optical signal, as described herein, $\lambda_1$ is the first wavelength, and $\lambda_2$ is the second wavelength. The difference between the first wavelength and the second wavelength may also be represented as a difference in wavelengths, $\Delta\lambda$.

Alternatively, or additionally, the location of the dynamic anomaly within the transmission medium 115 may be determined using the time delay, the first wavelength associated with the first optical signal, the second wavelength associated with the second optical signal, and the dispersion factor associated with the transmission medium. For example, the location of the dynamic anomaly may be approximately equal to the time delay divided by a multiple of the dispersion factor with the difference between the first wavelength and the second wavelength. The location of the dynamic anomaly in the transmission medium 115, as measured from an output end of the transmission medium 115 (e.g., adjacent to the receiver 110), may be represented by the equation:

$$L = \tau_{max}/(D^*\Delta\lambda)$$

where L is the anomaly location represented as a length from the receiver end of the transmission medium 115 (e.g., adjacent to the receiver 110) to the dynamic anomaly, $\tau_{max}$ is the time delay that maximizes the cross-correlation between the first optical signal and the second optical signal, $\Delta\lambda$ is the difference between the first wavelength and the second wavelength, and D is the dispersion factor.

In some embodiments, the anomaly location within the transmission medium 115, once obtained, may be transmitted to a system or device. The system or device may be remote from the optical transmission system 102 and may be associated with a technician and/or network operator which may perform one or more operations directed to removing the dynamic anomaly from the determined anomaly location within the transmission medium 115 of the optical transmission system 102.

In some embodiments, the transmission of the anomaly location may be performed automatically in response to the determination of the anomaly location within the transmission medium 115. For example, in instances in which a determination is obtained that a dynamic anomaly is present in the transmission medium 115, the anomaly location may be determined, as described herein, and the anomaly location may be automatically transmitted to a system or device, such as a technician's device such that the dynamic anomaly may be mitigated, repaired, and/or removed from the transmission medium 115 and the optical transmission system 102.

Modifications, additions, or omissions may be made to the environment 100 without departing from the scope of the present disclosure. For example, in some embodiments, the environment 100 may include any number of other components that may not be explicitly illustrated or described.

Figure 2:
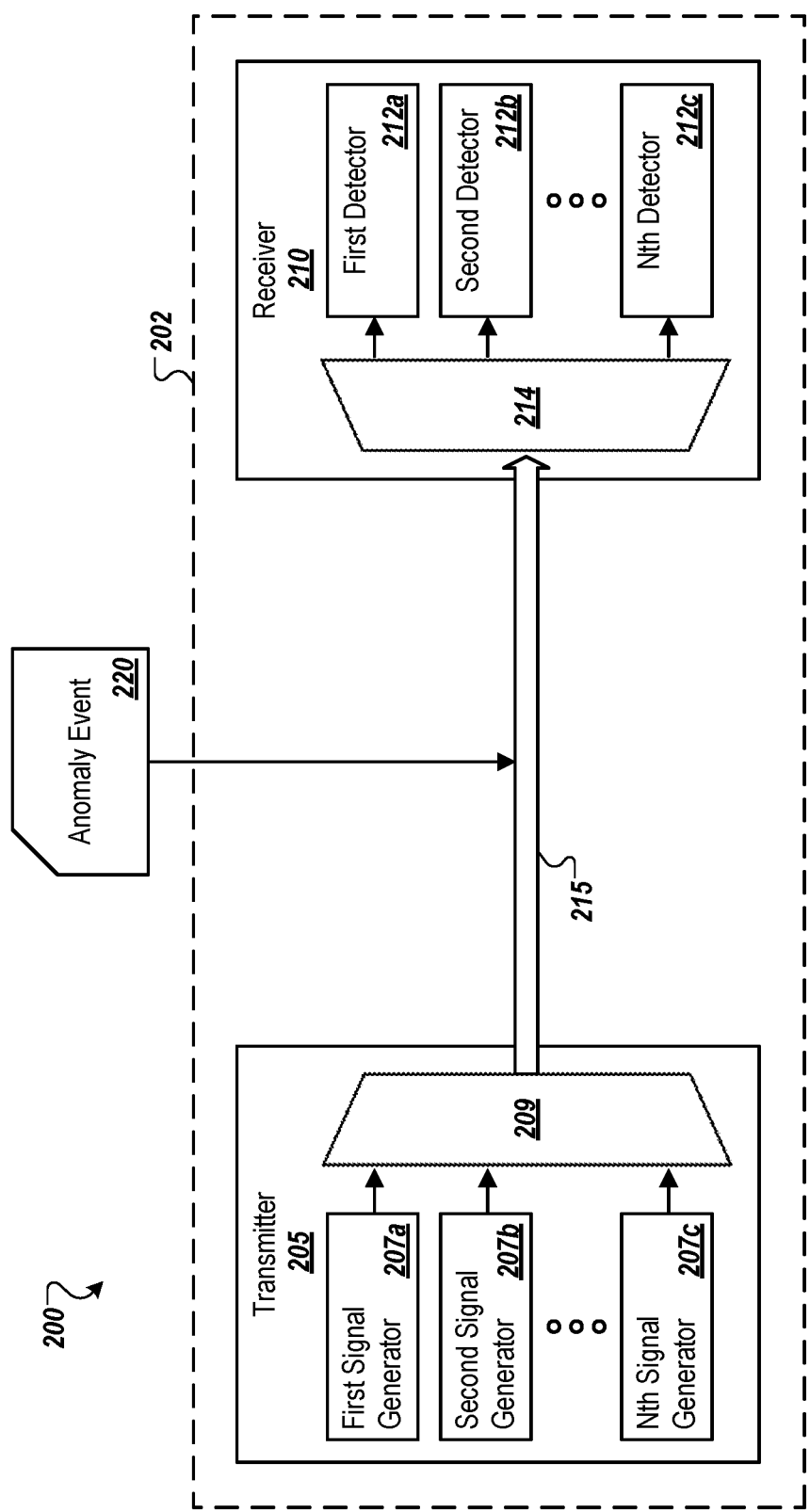
FIG. 2 is another block diagram of an example environment configured to localize a dynamic anomaly in an optical transmission system.

FIG. 2 is a block diagram of an environment 200 configured to localize a dynamic anomaly in an optical transmission system 202, in accordance with at least one embodiment of the present disclosure. The optical transmission system 202 may include a transmitter 205, a receiver 210, and a transmission medium 215. The transmitter 205 may include a first signal generator 207a, a second signal generator 207b, and an nth signal generator 207c, referred to collectively as signal generators 207, and a multiplexing device 209. The receiver 210 may include a first detector 212a, a second detector 212b, and an nth detector 212c, referred to collectively as detectors 212, and a demultiplexing device 214.

In some embodiments, one or more elements included in the environment 200 may be the same or similar to the elements included in the environment 100 of FIG. 1. For example, the transmitter 205, the receiver 210, the transmission medium 215, and/or the anomaly event 220 may be the same or similar as the transmitter 105, the receiver 110, the transmission medium 115, and/or the anomaly event 120 of FIG. 1, respectively. In these or other embodiments, the same or similar elements in the environment 200 relative to the elements in the environment 100 may include substantially similar connections relative to one another and may be configured to perform substantially the same operations as described relative to FIG. 1. Alternatively, or additionally, an anomaly event 220 may be the same or similar as the anomaly event 120 of FIG. 1, with respect to introducing a dynamic anomaly into the transmission medium 215 of the optical transmission system 202.

In some embodiments, the transmitter 205 may be configured to multiplex two or more optical signals into a single transmission. For example, the transmitter 205 may be a wave division multiplexing (WDM) transmitter which may be configured to receive at least a first optical signal having a first wavelength and a second optical signal having a second wavelength and multiplex the first optical signal and the second optical signal into a single transmission via the transmission medium 215.

In some embodiments, the signal generators 207 may be configured to individually generate an optical signal that may be included in a transmission over the transmission medium 215. For example, the first signal generator 207a may generate a first optical signal having a first wavelength, the second signal generator 207b may generate a second optical signal having a second wavelength, and the nth signal generator 207c may generate an nth optical signal having an nth wavelength. The first optical signal, the second optical signal, and the nth optical signal may be multiplexed into a transmission by the multiplexing device 209 and the transmission (e.g., including the first optical signal, the second optical signal, and the nth optical signal) may be transmitted by the transmitter 205 over the transmission medium 215.

In these or other embodiments, an individual signal generator of the signal generators 207 may be configured to encode data into an optical signal having an associated wavelength. The wavelength associated with the optical signal may differ from wavelengths associated with other optical signals, such as optical signals encoded with data by other signal generators. In some embodiments, the multiplexing device 209 may be configured to multiplex obtained optical signals into a transmission, such that multiple optical signals may be transmitted together over the transmission medium 215 as the transmission.

In some embodiments, the demultiplexing device 214 of the receiver 210 may obtain the transmission and may be configured to demultiplex the optical signals in the transmission. For example, upon obtaining the transmission by the receiver 210, the demultiplexing device 214 may demultiplex the transmission into individual optical signals that may be obtained by the detectors 212, respectively. For example, in instances in which a first optical signal, a second optical signal, and an nth optical signal are multiplexed into a transmission and received by the receiver 210, the demultiplexing device 214 may demultiplex the transmission such that the first optical signal may be obtained by the first detector 212a, the second optical signal may be obtained by the second detector 212b, and/or the nth optical signal may be obtained by the nth detector 212c.

In some embodiments, the detectors 212 may include one or more optical photodetectors configured to receive an optical signal, which detectors 212 may be used for power monitoring of the optical signal. For example, one or more of the detectors 212 may include a photodiode, a photo transistor, and/or other optical photodetectors. In these or other embodiments, the detectors 212 may be configured to convert the received optical signals into a voltage or a current such that additional operations, such as described relative to FIG. 1, may be performed using the received optical signals. In some embodiments, the voltage or current associated with the received optical signals may be proportional to an optical signal power of the received optical signal. Alternatively, or additionally, the optical signal power of the received optical signal may be filtered with a low pass filter, such that an associated data pattern may be averaged out and the change to the optical signal power due to the dynamic anomaly may be monitored.

In some embodiments, the number of signal generators 207 that may be included in the transmitter 205 may be a fixed number. For example, the transmitter 205 may include two, four, five, eight, ten, and/or any other number of signal generators. In some embodiments, the signal generators 207 may be configured to encode data into an optical signal. Alternatively, or additionally, in some embodiments, the signal generators 207 may be configured to include shaped amplified spontaneous emission (ASE) noise in an optical signal. In some embodiments, any combination of signals having encoded data and/or ASE noise may be generated by the signal generators 207 and multiplexed by the multiplexing device 209. For example, a first optical signal from the first signal generator 207a may include encoded data and a second optical signal from the second signal generator 207b may include shaped ASE noise, and the first optical signal and the second optical signal may be multiplexed into a transmission by the multiplexing device 209. In another example, a first optical signal from the first signal generator 207a may include encoded data and a second optical signal from the second signal generator 207b may include encoded data, and the first optical signal and the second optical signal may be multiplexed into a transmission by the multiplexing device 209. In another example, a first optical signal from the first signal generator 207a may include ASE noise and a second optical signal from the second signal generator 207b may include ASE noise, and the first optical signal and the second optical signal may be multiplexed into a transmission by the multiplexing device 209.

In these or other embodiments, as the optical signals from the signal generators 207 include at least encoded data or shape ASE noise, any of the optical signals included in a transmission over the transmission medium 215 may be used in determining an anomaly location, as discussed herein. For example, a transmission may include a first optical signal having a first wavelength and including encoded data and may include a second signal having a second wavelength and including shaped ASE noise, where the first optical signal and the second optical signal may be used to determine an anomaly location within the transmission medium 215.

Modifications, additions, or omissions may be made to the environment 200 without departing from the scope of the present disclosure. For example, in some embodiments, the environment 200 may include any number of other components that may not be explicitly illustrated or described.

Figure 3:
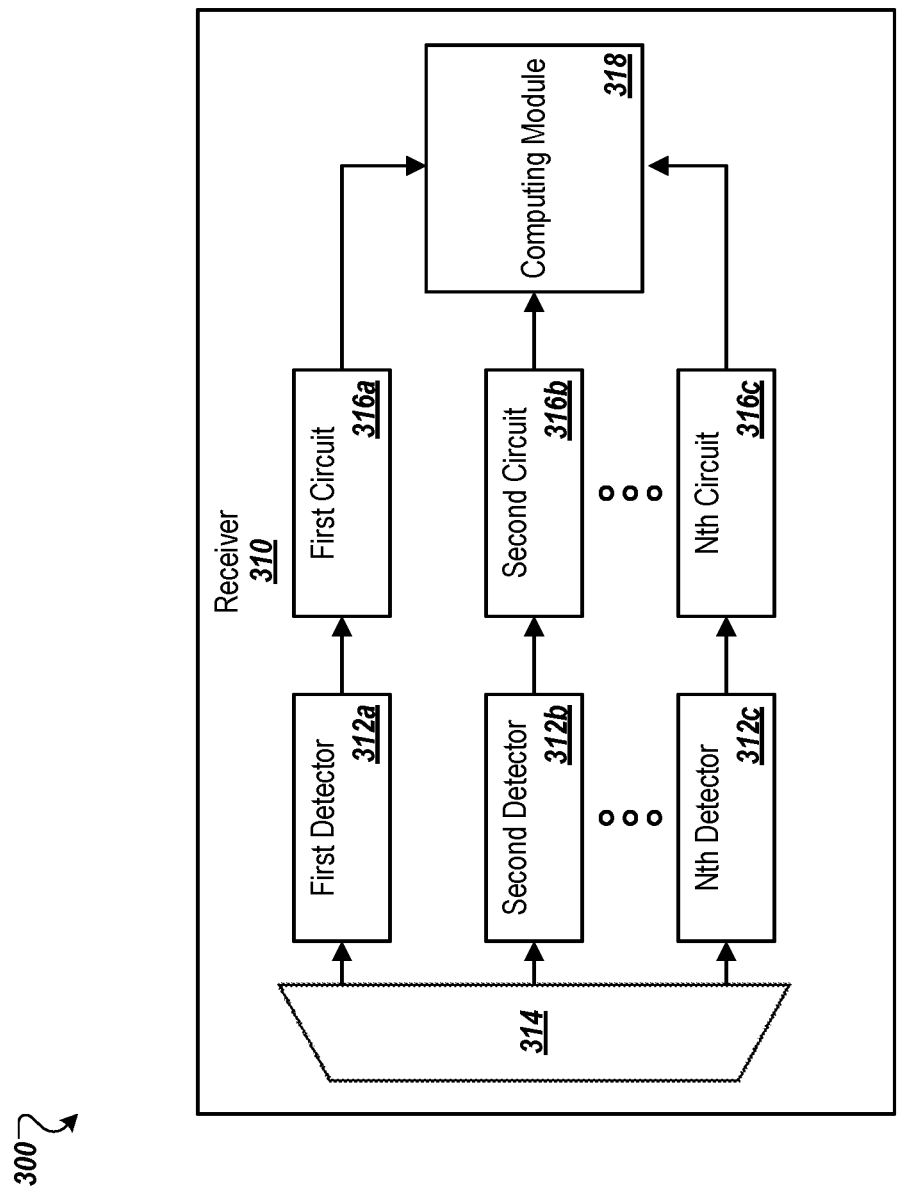
FIG. 3 is another block diagram of an example environment configured to localize a dynamic anomaly in an optical transmission system.

FIG. 3 is a block diagram of an environment 300 configured to localize a dynamic anomaly in an optical transmission system, in accordance with at least one embodiment of the present disclosure. The environment 300 may include a receiver 310. The receiver 310 may include a first detector 312a, a second detector 312b, and an nth detector 312c, referred to collectively as detectors 312, a demultiplexing device 314, a first circuit 316a, a second circuit 316b, and an nth circuit 316c, referred to collectively as circuits 316, and a computing module 318.

In some embodiments, one or more elements included in the receiver 310 may be the same or similar to the elements included in the receiver 210 of FIG. 2. For example, the first detector 312a, the second detector 312b, the nth detector 312c, and/or the demultiplexing device 314 may be the same or similar as the first detector 212a, the second detector 212b, the nth detector 212c, and/or the demultiplexing device 214 of FIG. 2, respectively.

In some embodiments, individual detectors of the detectors 312 may be communicatively coupled with respective individual circuits of the circuits 316. For example, the first detector 312a may be communicatively coupled with the first circuit 316a, the second detector 312b may be communicatively coupled with the second circuit 316b, and so forth. In some embodiments, individual circuits of the circuits 316 may be communicatively coupled with the computing module 318.

In some embodiments, the detectors 312 may receive individual optical signals that may be demultiplexed by the demultiplexing device 314 and the detectors 312 may generate an output (e.g., a voltage and/or a current) associated with the received optical signal. For example, the first detector 312a may generate a first output, the second detector 312b may generate a second output, and so forth. In some embodiments, the output from the detectors 312 may be input to the circuits 316.

In some embodiments, the circuits 316 may be configured to perform various conditioning to the output from the detectors 312. For example, the circuits 316 may be configured to filter, amplify, attenuate, convert, isolate, and/or perform other operations on the output received from the respective detectors 312. In instances in which the detectors 312 generate an output including an analog voltage and/or an analog current, the output may be input to the circuits 316 which may filter the output, amplify the output, and/or convert the analog output to a digital output (e.g., an analog-to-digital converter (ADC)) in preparation for additional processing, such as by the computing module 318.

In some embodiments, the computing module 318 may be configured to perform one or more of the operations described relative to FIG. 1. For example, the computing module 318 may be configured to obtain a determination that a dynamic anomaly may be present in a transmission medium, and/or determine an anomaly location within the transmission medium using one or more inputs such as obtained from the circuits 316. Alternatively, or additionally, the computing module 318 may be configured to perform one or more operations prior to and/or in association with determining the dynamic anomaly presence and/or determining the anomaly location within the transmission medium. For example, the computing module 318 may be configured to determine a time delay based on a relationship between wavelengths of optical signals received, such as by the detectors 312.

In some embodiments, the computing module 318 may include code and routines configured to allow one or more computing devices to perform one or more operations. Additionally, or alternatively, the computing module 318 may be implemented using hardware including one or more processors, central processing units (CPUs), graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), and/or other processor types. In some other instances, the computing module 318 may be implemented using a combination of hardware and software. In the present disclosure, operations described as being performed by computing module 318 may include operations that the computing module 318 may direct a corresponding system to perform.

In some embodiments, the computing module 318 may be used to perform a calibration of an optical transmission system, such as the optical transmission system 102 of FIG. 1. Alternatively, or additionally, the computing module 318 may be calibrated prior to determining an anomaly location within a transmission medium. In some embodiments, the calibration may include selecting two or more optical signals to be included in a transmission via a transmission medium. In some embodiments, the two or more optical signals may include different wavelengths from one another. In some embodiments, as part of the calibration, the two optical signals may include respective wavelengths that may or may not be adjacent to one another. For example, a first optical signal may include a wavelength in the L-band and a second optical signal may include a wavelength in the C-band.

In some embodiments, calibration may include introducing one or more anomalies in the transmission medium, such as a first dynamic anomaly at a first anomaly location and a second dynamic anomaly at a second anomaly location. Based on the locations of the first dynamic anomaly and the second dynamic anomaly, a first time delay and a second time delay may be obtained relative to changes of the first optical signal and the second optical signal propagating in the transmission medium with the anomalies. In some embodiments, the first anomaly location, the second anomaly location, and the associated first time delay and the second time delay may be used in conjunction with the first wavelength and the second wavelength (e.g., such as described in FIG. 1 relative to determining an anomaly location within a transmission medium) to determine a relationship between the time delay and the anomaly location. For example, the first anomaly location and the first time delay may be plotted as a first point (e.g., a location or distance relative to time) on a graph (e.g., having axes of distance and time) and the second anomaly location and the second time delay may be plotted as a second point on the graph, and the relationship between the two points may be determined. In some embodiments, the relationship between the time delay and the anomaly location may be a linear relationship.

In these or other embodiments, the relationship determined between the time delay and the anomaly location, as part of the calibration, may be used to determine the anomaly location when the anomaly location may not be known, such as described relative to the environment 100 of FIG. 1. For example, the determined relationship based on the first wavelength, the second wavelength, the first time delay, and the second time delay may be a factor (e.g., a variable) that may be used in future calculations that may be associated with dynamic anomaly detection in an optical transmission system. For example, in response to determining a time delay between two optical signals propagating in a transmission medium of an optical transmission system and having completed a calibration, as described herein, the factor may be applied to (e.g., multiplied with) the time delay to determine an approximate anomaly location within the transmission medium of the optical transmission system.

Modifications, additions, or omissions may be made to the environment 300 without departing from the scope of the present disclosure. For example, in some embodiments, the circuits 316 may be incorporated into the detectors 312. In some embodiments, the computing module 318 may be included in a standalone system or device, such that the computing module 318 may not be included in the receiver 310. In such instances, the outputs from the detectors 312 and/or the circuits 316 may be transmitted to another system or device where the computations, as described herein, may be performed. Alternatively, or additionally, the environment 300 may include any number of other components that may not be explicitly illustrated or described.

Figure 4:
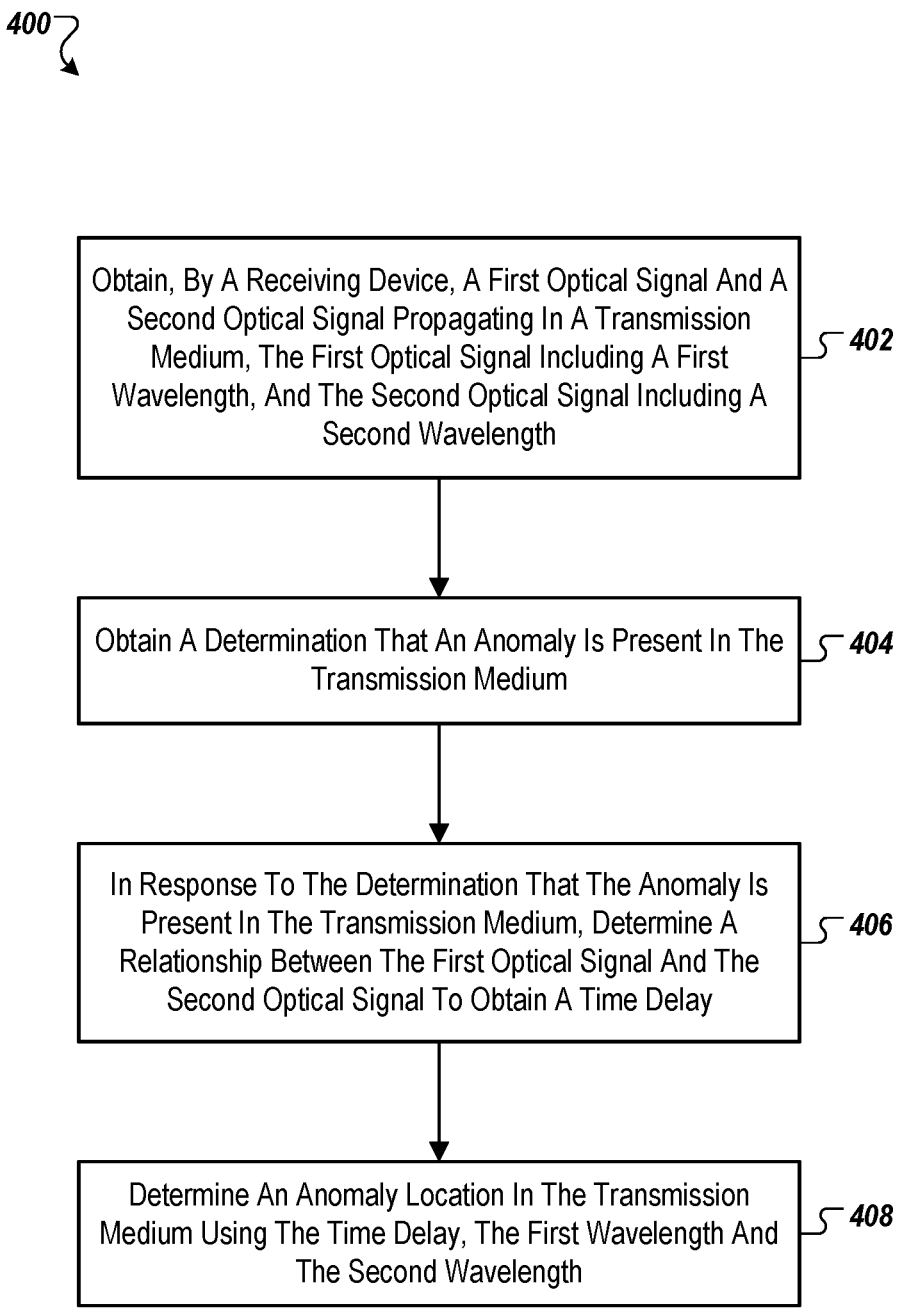
FIG. 4 is a flowchart of an example method of localization of a dynamic anomaly in an optical transmission system.

FIG. 4 is a flowchart of an example method 400 of localization of a dynamic anomaly in an optical transmission system, in accordance with at least one embodiment of the present disclosure. One or more operations of the method 400 may be performed, in some embodiments, by a device or system, or combination of devices or systems. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402 where a first optical signal and a second optical signal propagating in a transmission medium may be obtained by a receiving device. In some embodiments, the first optical signal may include a first wavelength and the second optical signal may include a second wavelength. In some embodiments, a difference between the first wavelength and the second wavelength may be determined. In some embodiments, the transmission medium may include a dispersion factor.

In some embodiments, the first wavelength may be included in a first wavelength range and the second wavelength may be included in a second wavelength range. In some embodiments, the first wavelength range may not overlap the second wavelength range.

In some embodiments, the first optical signal may include encoded data and the second optical signal may include shaped ASE noise. Alternatively, or additionally, in some embodiments, the first optical signal and the second optical signal may be multiplexed into a single transmission in the transmission medium.

At block 404, a determination that a dynamic anomaly is present in the transmission medium may be obtained. In some embodiments, a first received power associated with the first optical signal and a second received power associated with the second optical signal may be obtained at the receiving device. In some embodiments, the presence of the dynamic anomaly in the transmission medium may be determined by comparing the first received power with a first expected power of the first optical signal and comparing the second received power with a second expected power of the second optical signal. In some embodiments, the dynamic anomaly may include a micro-bend in the transmission medium.

At block 406, in response to the determination that the dynamic anomaly is present in the transmission medium, a relationship between the first optical signal and the second optical signal may be determined. In some embodiments, the relationship may be used to obtain a time delay. In some embodiments, the relationship between the first optical signal and the second optical signal may be determined by performing a cross-correlation between the first optical signal and the second optical signal. In some embodiments, the cross-correlation may include determining an integral of the first optical signal multiplied by the second optical signal as the second optical signal is shifted in time. Alternatively, or additionally, the cross-correlation may include determining an integral of a first monitored power associated with the first optical signal multiplied by a second monitored power associated with the second optical signal as the second optical signal is shifted in time.

At block 408, an anomaly location in the transmission medium may be determined. In some embodiments, the anomaly location may be determined using the time delay, the first wavelength, and the second wavelength. Alternatively, or additionally, the anomaly location may be determined using the dispersion factor associated with the transmission medium. Alternatively, or additionally, the difference between the first wavelength and the second wavelength may be used in determining the anomaly location.

In some embodiments, in response to determining the anomaly location, the anomaly location may be transmitted to a user device. In some embodiments, the transmission of the anomaly location to the user device may be performed automatically.

Modifications, additions, or omissions may be made to the method 400 without departing from the scope of the present disclosure. For example, in some embodiments, the method 400 may include any number of other components that may not be explicitly illustrated or described.

Figure 5:
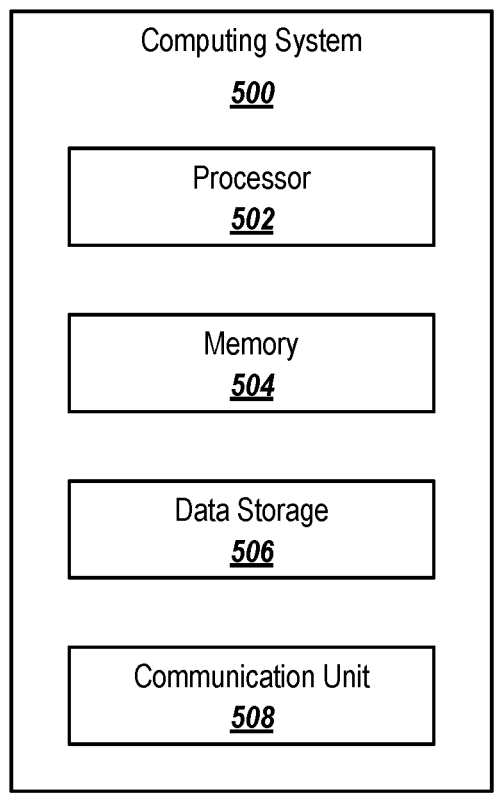
FIG. 5 illustrates an example computing system that may be used for localization of a dynamic anomaly in an optical transmission system.

FIG. 5 illustrates an example computing system 500 that may be used for localization of a dynamic anomaly in an optical transmission system, in accordance with at least one embodiment of the present disclosure. The computing system 500 may be configured to implement or direct one or more operations associated with localization of a dynamic anomaly in an optical transmission system, which may include operation of one or more components included in the optical transmission system 102 of FIG. 1 and/or the optical transmission system 202 of FIG. 2, operation of the receiver 310 of FIG. 3, and/or performance of the method 400 of FIG. 4. The computing system 500 may include a processor 502, memory 504, data storage 506, and a communication unit 508, which all may be communicatively coupled. In some embodiments, the computing system 500 may be part of any of the systems or devices described in this disclosure.

The processor 502 may include any computing entity, or processing device including various computer hardware or software modules and may be configured to execute instructions stored on any applicable computer-readable storage media. For example, the processor 502 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 502 may include any number of processors distributed across any number of networks or physical locations that are configured to perform individually or collectively any number of operations described herein.

In some embodiments, the processor 502 may be configured to interpret and/or execute program instructions and/or process data stored in the memory 504, the data storage 506, or the memory 504 and the data storage 506. In some embodiments, the processor 502 may fetch program instructions from the data storage 506 and load the program instructions in the memory 504. After the program instructions are loaded into memory 504, the processor 502 may execute the program instructions.

For example, in some embodiments, the processor 502 may be configured to interpret and/or execute program instructions and/or process data stored in the memory 504, the data storage 506, or the memory 504 and the data storage 506. The program instruction and/or data may be related to localization of a dynamic anomaly in an optical transmission system such that the computing system 500 may perform or direct the performance of the operations associated therewith as directed by the instructions. In these and other embodiments, the instructions may be used to perform the method 400 of FIG. 4.

The memory 504 and the data storage 506 may include computer-readable storage media or one or more computer-readable storage mediums for carrying or having computer-executable instructions or data structures stored thereon. Such computer-readable storage media may be any available media that may be accessed by a computer, such as the processor 502.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a computer. Combinations of the above may also be included within the scope of computer-readable storage media.

Computer-executable instructions may include, for example, instructions and data configured to cause the processor 502 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 508 may include any component, device, system, or combination thereof that is configured to transmit or receive information over a network. In some embodiments, the communication unit 508 may communicate with other devices at other locations, the same location, or even other components within the same system. For example, the communication unit 508 may include a modem, a network card (wireless or wired), an infrared communication device, a wireless communication device (such as an antenna implementing 4G (LTE), 4.5G (LTE-A), and/or 5G (mmWave) telecommunications), and/or chipset (such as a Bluetooth® device (e.g., Bluetooth 5 (Bluetooth Low Energy)), an 802.6 device (e.g., Metropolitan Area Network (MAN)), a Wi-Fi device (e.g., IEEE 802.11 ax, a WiMAX device, cellular communication facilities, etc.), and/or the like. The communication unit 508 may permit data to be exchanged with a network and/or any other devices or systems described in the present disclosure.

Modifications, additions, or omissions may be made to the computing system 500 without departing from the scope of the present disclosure. For example, in some embodiments, the computing system 500 may include any number of other components that may not be explicitly illustrated or described. Further, depending on certain implementations, the computing system 500 may not include one or more of the components illustrated and described.

As indicated above, the embodiments described herein may include the use of a computing system (e.g., the processor 502 of FIG. 5) including various computer hardware or software modules. Further, as indicated above, embodiments described herein may be implemented using computer-readable media (e.g., the memory 504 of FIG. 5) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
obtaining, by a receiving device, a first optical signal and a second optical signal propagating in a transmission medium, the first optical signal including a first wavelength, the second optical signal including a second wavelength;
obtaining a determination that an anomaly is present in the transmission medium; in response to the determination that the anomaly is present in the transmission medium, determining a relationship between the first optical signal and the second optical signal using a cross-correlation to obtain a time delay, wherein the cross-correlation comprises an integral of a first monitored power associated with the first optical signal multiplied by a second monitored power associated with the second optical signal as the second optical signal is shifted in time; and
determining an anomaly location in the transmission medium using the time delay, the first wavelength, and the second wavelength.

2. The method of claim 1, further comprising:
obtaining a first received power of the first optical signal at the receiving device;
obtaining a second received power of the second optical signal at the receiving device; and
determining a presence of the anomaly in the transmission medium by comparing the first received power with a first expected power of the first optical signal and comparing the second received power with a second expected power of the second optical signal.

3. The method of claim 1, wherein the transmission medium includes a dispersion factor, and the anomaly location is determined using the dispersion factor.

4. The method of claim 1, wherein the anomaly comprises a micro-bend in the transmission medium.

5. The method of claim 1, wherein the first wavelength is included in a first wavelength range and the second wavelength is included in a second wavelength range that does not overlap the first wavelength range.

6. The method of claim 1, wherein the first optical signal includes encoded data, and the second optical signal includes shaped amplified spontaneous emission (ASE) noise.

7. The method of claim 1, wherein the first optical signal and the second optical signal are multiplexed into a single transmission in the transmission medium.

8. The method of claim 1, further comprising determining a difference between the first wavelength and the second wavelength, wherein the anomaly location is further determined based on the difference.

9. The method of claim 1, further comprising in response to determining the anomaly location, automatically transmitting the anomaly location to a user device.

10. A system comprising:
one or more computer-readable storage media configured to store instructions; and
one or more processors communicatively coupled to the one or more computer-readable storage media and configured to, in response to execution of the instructions, cause the system to perform operations, the operations comprising:
obtaining, by a receiving device, a first optical signal and a second optical signal propagating in a transmission medium, the first optical signal including a first wavelength, the second optical signal including a second wavelength;
obtaining a determination that an anomaly is present in the transmission medium;
in response to the determination that the anomaly is present in the transmission medium, determining a relationship between the first optical signal and the second optical signal using a cross-correlation to obtain a time delay, wherein the cross-correlation comprises an integral of a first monitored power associated with the first optical signal multiplied by a second monitored power associated with the second optical signal as the second optical signal is shifted in time; and
determining an anomaly location in the transmission medium using the time delay, the first wavelength, and the second wavelength.

11. The system of claim 10, further comprising:
obtaining a first received power of the first optical signal at the receiving device;
obtaining a second received power of the second optical signal at the receiving device; and
determining a presence of the anomaly in the transmission medium by comparing the first received power with a first expected power of the first optical signal and comparing the second received power with a second expected power of the second optical signal.

12. The system of claim 10, wherein the transmission medium includes a dispersion factor, and the anomaly location is determined using the dispersion factor.

13. The system of claim 10, wherein the anomaly comprises a micro-bend in the transmission medium.

14. The system of claim 10, wherein the first wavelength is included in a first wavelength range and the second wavelength is included in a second wavelength range that does not overlap the first wavelength range.

15. The system of claim 10, wherein the first optical signal includes encoded data, and the second optical signal includes shaped ASE noise.

16. The system of claim 10, wherein the first optical signal and the second optical signal are multiplexed into a single transmission in the transmission medium.

17. The system of claim 10, further comprising determining a difference between the first wavelength and the second wavelength, wherein the anomaly location is further determined based on the difference.

18. The method of claim 1, wherein the anomaly is a dynamic anomaly.

19. The method of claim 3, wherein the anomaly location is determined by dividing the time delay by a multiple of the dispersion factor with the difference between the first wavelength and the second wavelength.

20. The method of claim 5, wherein the first wavelength is an L-band wavelength and the second wavelength is a C-band wavelength.

* * * * *